United States Patent
Small et al.

(10) Patent No.: US 12,481,167 B2
(45) Date of Patent: Nov. 25, 2025

(54) FIBER-BASED ANGULAR HOMOGENIZER

(71) Applicant: NLIGHT, INC., Camas, WA (US)

(72) Inventors: Jay Small, Camas, WA (US); Shuang Li, Camas, WA (US); Dahv A.V. Kliner, Camas, OR (US)

(73) Assignee: nLIGHT, Inc., Camas, WA (US)

( * ) Notice: Subject to any disclaimer, the term of this patent is extended or adjusted under 35 U.S.C. 154(b) by 224 days.

(21) Appl. No.: 17/777,248

(22) PCT Filed: Nov. 19, 2020

(86) PCT No.: PCT/US2020/061363
§ 371 (c)(1),
(2) Date: May 16, 2022

(87) PCT Pub. No.: WO2021/102187
PCT Pub. Date: May 27, 2021

(65) Prior Publication Data
US 2023/0359051 A1 Nov. 9, 2023

Related U.S. Application Data

(60) Provisional application No. 62/939,404, filed on Nov. 22, 2019.

(51) Int. Cl.
*G02B 27/09* (2006.01)
*C03B 37/027* (2006.01)
(Continued)

(52) U.S. Cl.
CPC .... *G02B 27/0994* (2013.01); *C03B 37/02745* (2013.01); *G02B 6/0286* (2013.01); *G02B 6/4206* (2013.01); *C03B 2203/26* (2013.01)

(58) Field of Classification Search
CPC .... G02B 6/028; G02B 6/0286; G02B 6/0288; G02B 27/0994; G02B 6/4206; C03B 37/02745; C02B 2203/26
See application file for complete search history.

(56) References Cited

U.S. PATENT DOCUMENTS 8,280,213 B2 * 10/2012 Molin ................ G02B 6/0288
385/127
8,824,848 B1 * 9/2014 Enomoto ............ G02B 6/0288
385/124

(Continued)

FOREIGN PATENT DOCUMENTS

CN 103145794 A1 11/2013
JP H0534528 A1 2/1993
(Continued)

OTHER PUBLICATIONS

Federal Institute of Industrial Property; International Search Report and Written Opinion PCT/US2020/061363 dated Mar. 4, 2021; 8 Pages.

*Primary Examiner* — Thomas A Hollweg
*Assistant Examiner* — Kirsten D. Endresen
(74) *Attorney, Agent, or Firm* — Wiley Rein LLP

(57) ABSTRACT

Angularly homogenizing gradient index optical fiber having a refractive index profile that is non-quadratic to a degree sufficient to enhance precession of light as it is propagated through the fiber. Deviation from the quadratic may be limited to avoid profoundly changing the radial boundary within the fiber. Beam asymmetry, for example, associated with small aperture sources launched into a fiber off axis, may be made more symmetric as the beam is propagated through the homogenizing gradient index optical fiber. A refractive index profile may be manufactured to avoid a pure quadratic profile, or a fiber having a refractive index profile that is quadratic in only some orientations about the fiber axis may be twisted during draw to induce a refractive index profile path that enhances propagation precession.

11 Claims, 9 Drawing Sheets

(51) Int. Cl.
*G02B 6/028* (2006.01)
*G02B 6/42* (2006.01)

(56) References Cited

U.S. PATENT DOCUMENTS 9,063,289 B1 * 6/2015 Farmer ................ G02B 6/2821
2007/0196062 A1 8/2007 Inoue et al.

FOREIGN PATENT DOCUMENTS

WO    WO 2014/05756 A1    7/2014
WO    WO-2014105756 A1 *  7/2014   ........... G02B 6/0288

* cited by examiner

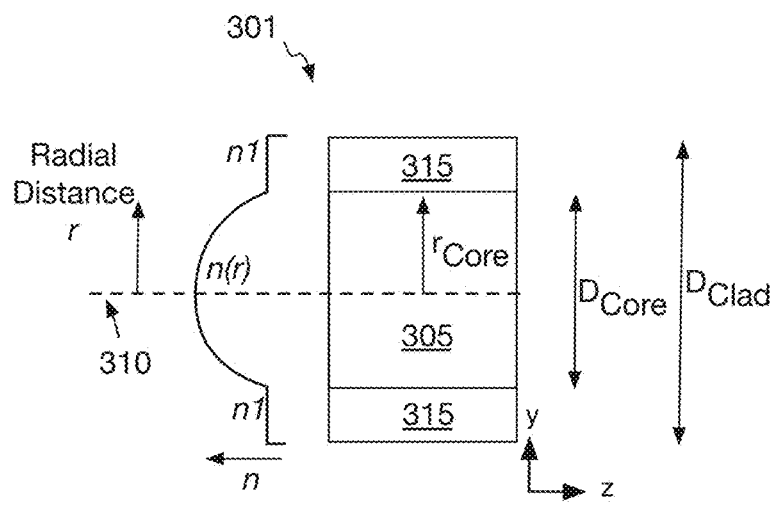
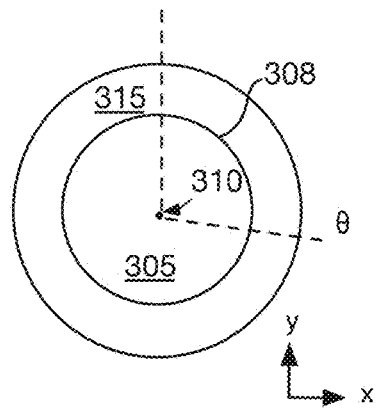
FIG. 3A          FIG. 3B
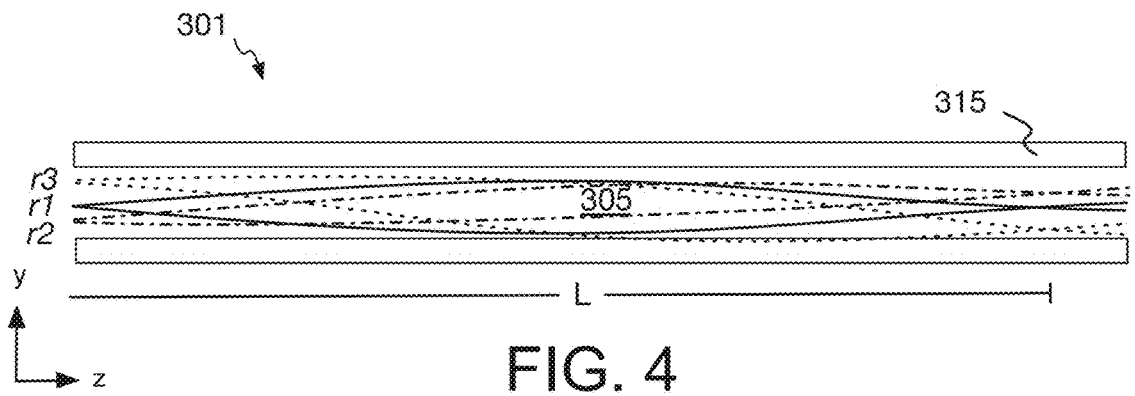
FIG. 4

FIBER-BASED ANGULAR HOMOGENIZER

RELATED APPLICATIONS

The present application is a National Phase entry under 35 U.S.C. § 371 of International Application No. PCT/US2020/061363, filed on Nov. 19, 2020, which claims priority to U.S. Provisional Application No. 62/939,404, filed on Nov. 22, 2019, the entire contents of these applications are incorporated herein by reference in their entirety.

TECHNICAL FIELD

The technology described herein relates to optical fibers, and more particularly relates to optical fibers having a gradient refractive index (GRIN).

BACKGROUND

Optical systems have many applications, including communication, materials processing, and sensing. Such optical systems often employ lasers, for example, fiber lasers, disk lasers, diode lasers, diode-pumped solid state lasers, and lamp-pumped solid state lasers. In these systems, optical power is often delivered by an optical fiber.

Some optical fibers are designed to include a core having a gradient refractive index. Such "GRIN" fibers often have a refractive index profile (RIP) that best replicates an aberration-free lens, which preserves the brightness of the input source. However, such fibers can preserve characteristics of the input so that any asymmetry in the input source may be maintained as asymmetry in the fiber output, which may be manifested as an elliptical, or flattened, output beam pattern, for example. Asymmetrical output beam patterns are often considered undesirable in an optical system, particularly a laser system.

Optical fiber that improves output beam pattern symmetry without losing significant input source brightness would therefore be advantageous.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings:

FIGS. 3A and 3B illustrates orthogonal cross-sectional views of an optical fiber including a core having a gradient refractive index, in accordance with some embodiments;

FIG. 4 illustrates optical fiber propagation of an input beam including components launched at different radial positions, in accordance with some embodiments;

DETAILED DESCRIPTION

Figure 1:
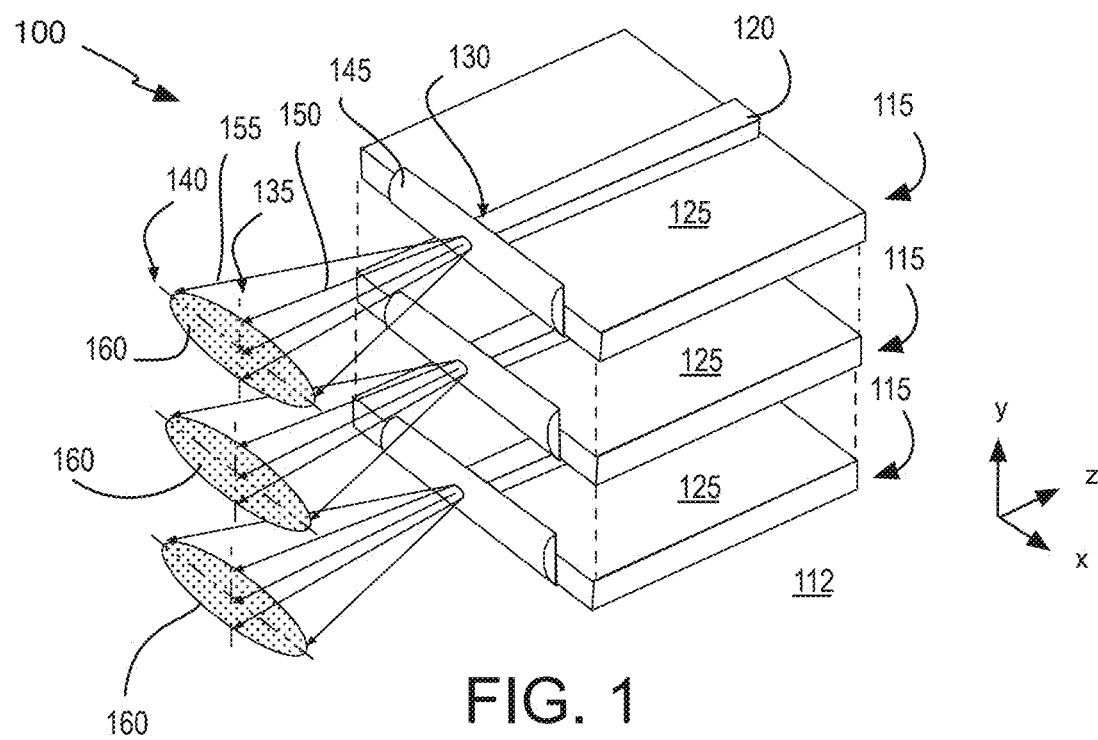
FIG. 1 illustrates an isometric view of a laser diode source suitable as an input to an optical fiber, in accordance with some embodiments.

As used herein throughout this disclosure and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Also, the terms "modify" and "adjust" are used interchangeably to mean "alter."

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Reference throughout this specification to "an embodiment" or "one embodiment" or "some embodiments" means that a particular feature, structure, function, or characteristic described in connection with the embodiment is included in at least one embodiment. Thus, the appearances of the phrase "in an embodiment" or "in one embodiment" or "some embodiments" in various places throughout this specification are not necessarily referring to the same embodiment. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

A "device" may generally refer to an apparatus according to the context of the usage of that term. For example, a device may refer to a stack of layers or structures, a single structure or layer, a connection of various structures having active and/or passive elements, etc. Generally a device is a three dimensional structure with a lateral x-y plane and a height along the z direction within an x-y-z Cartesian coordinate system. The plane of the device may also be the plane of an apparatus, which comprises the device.

Unless otherwise specified the use of the ordinal adjectives "first," "second," and "third," etc., to describe a common object, merely indicates that different instances of like objects are being referred to, and are not intended to imply that the objects so described must be in a given sequence, either temporally, spatially, in ranking or in any other manner.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

Disclosed herein are fibers, optical systems, and methods for angularly homogenizing an optical beam. An exemplary system in accordance with some embodiments includes a fiber having an RIP that is non-quadratic to a degree sufficient to enhance propagation precession without too significantly changing the radial confinement boundary within the fiber. A length of fiber having such a "precessing" graded RIP may be employed in a fiber system to angularly homogenize a beam and reduce beam asymmetry associated with an off-axis launch. The higher the precession rate, the shorter the homogenizing fiber may be. In some embodiments, a fiber having an RIP along at least one orientation about the fiber axis that is non-quadratic can be twisted during draw at a rate sufficient to induce an RIP path that enhances propagation precession. For such embodiments, the twist may induce propagation or oscillation precession even where the RIP is quadratic along one or more other orientations.

Methods may include receiving an input optical beam having an angular and/or spatial asymmetry about a fiber axis. Such an input optical beam may be generated by a small number diode lasers having a small NA, for example. The asymmetric input enters a length of fiber having a precessing graded RIP that rotationally, or angularly, homogenizes the beam as it propagates to an output where a beam with improved angular and/or spatial symmetry is provided.

Notably, the optical fibers described herein are compatible with a wide variety of optical systems. For example, fiber described herein may be well suited to a variety of applications, including materials processing, chemical or physical sensing, and medical or biological applications, among others. Also of note, the fibers described herein are compatible with optical systems that include a wide variety of lasers. Optical systems disclosed herein include an input source that may generate a source beam that is spatially asymmetric and/or having components that can be launched into a fiber off the fiber axis. The optical systems further include a length of fiber to propagate a beam launched from the source between an optical input and an optical output. At least some of that length of fiber has a precessing graded RIP, in accordance with one or more of the embodiments described herein.

FIG. 1 illustrates an isometric view of a laser diode source 100 suitable as an input to an optical fiber, in accordance with some embodiments. Laser diode source 100 includes a laser diode bar array including a plurality of semiconductor diode lasers 115, which may be ganged together to generate a source light beam of nearly any desired power. In the example illustrated, the semiconductor diode lasers 115 are fixedly attached to a housing surface 112. Attached or formed into the housing surface 112 is a mounting block (not depicted) that is to support semiconductor diode lasers 115 each including a single-emitter diode laser 120, mounted to a carrier plate 125. Semiconductor diode laser 120 may include a laser cavity and an emitting facet 130 through which an optical laser beam may be emitted therefrom. Semiconductor diode laser 120 may emit at any wavelength, but in some exemplary embodiments semiconductor diode laser 120 emits within the 800 nm-1000 nm band. Semiconductor diode laser 120 may comprise any semiconductor of suitable band gap, with GaAs or InP being suitable for the exemplary 800-1000 nm band. Semiconductor diode laser 120 may have any architecture, but is typically fabricated into the a parallelepiped, polyhedron, or other volumetric region. The laser cavity has a vertical (e.g., y-axis) facet dimension that is much smaller than a horizontal (e.g., x-axis) facet dimension. The horizontal facet dimension is generally parallel with a plane of the diode laser junction. Although dimensions may vary with implementation, in some examples the vertical facet dimension is 1-3 μm while the horizontal dimension is 50-400 μm. The laser cavity length (e.g., z-axis) is typically much larger, such as several hundred to several thousand microns. With the large aspect ratio of emitting facet 130, the emitted laser beam has a fast axis 135 corresponding to the shorter facet dimension and a slow axis 140 corresponding to the longer facet dimension. Fast axis 135 has higher optical divergence, and slow axis 140 has a lower optical divergence.

Emitted light diverges quickly along fast axis 135 in a diffraction limited manner, for example, due to the inverse proportionality of beam divergence angle and beam width at a particular wavelength. Because the divergence angle is large, a fast axis collimator 145 may be coupled in close proximity to emitting facet 130. Fast axis collimator 145 may be a lens of a half-cylindrical configuration, for example. In the fast axis, marginal rays 150 the exiting beam is close to a parallel out of fast axis collimator 145. Slow axis marginal rays 155 continue to diverge slowly through fast axis collimator 145. Thus, the exiting beam propagates through fast axis collimator 145 in the form of an elliptical beam spot 160 that is associated with the numerical aperture (NA) of each of the semiconductor diode lasers 115.

Although illustrated in FIG. 1 with a vertical (e.g., y-axis) arrangement, a laser diode bar array may have any spatial arrangement, for example with semiconductor diode lasers 115 instead arranged in a planar array (e.g., along x-axis), or in a stair cased array (e.g., over two or more of the x, y, and z-axis). Laser diode source 100 will output a multi-mode source beam indicative of a given diode array architecture, for example comprising a plurality of small NA elliptical beam spot 160 patterns that have a fixed spatial and/or angular arrangement that can be dependent on the particular number of laser diodes, their physical arrangement with respect to each other, and the overall effect of any additional conditioning optics (e.g., collimating mirrors, focusing lenses etc.) within the beam path that is to be coupled into an optical fiber.

Figure 2:
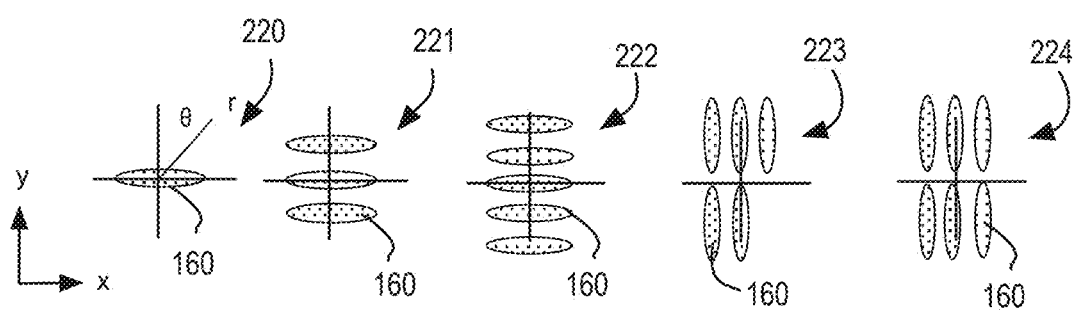
FIG. 2 illustrates spatial arrangements of laser diode source output beams, in accordance with some embodiments.

Notably, the current trend in laser diode technology is to increase individual emitter chip power while decreasing the number of emitters. While this trend may lower the cost of laser diode sources, the reduction in emitter chip count lowers the overall NA of the laser diode source and may also result in lower NA symmetry. FIG. 2 illustrates five exemplary spatial arrangements of laser diode source output beams. Spatial arrangement 220 includes a single elliptical beam spot 160, for example resulting from a single semiconductor diode laser chip. The elliptical beam spot 160 is associated with a smaller NA than that of an exemplary optical fiber core, and so the core area will receive illumination having radiance that varies a cross sectional area of the core. For example, radiance may decrease with greater radial distance r from the fiber axis. Since beam spot 160 is elliptical, radiance at the fiber input is also function of the (azimuthal) angular orientation θ at which elliptical beam spot 160 is coupled into the fiber.

The overall NA and NA symmetry of a laser diode source may be changed by spatially arranging a plurality of diode laser emitters. Spatial arrangement 221, for example, includes three elliptical beam spots 160 arranged into a vertical stack. The vertical stack may be implemented with the architecture of laser diode source 100 (FIG. 1), for example. Three elliptical beam spots 160, all being substantially the same, are to be coupled into different spatial regions of the optical fiber core, with a total radiance that is greater than (e.g., three times) that of a single emitter. At a fiber input, radiance will again vary over the cross sectional area of the core, but depending on the diode arrangement, elliptical beam spots 160 may, in combination, illuminate a larger fiber core area more or less symmetrically about the axis. Spatial arrangement 221 may illuminate a fiber input with larger effective NA and better NA symmetry than arrangement 220 if, for example, the vertical stack in arrangement 221 is spaced apart so that the three beam spots 160 spread over the vertical axis a distance nearly equal to the horizontal spread of each beam spot. Spatial arrangement 222 is another example of a source arrangement capable of some higher optical power level (e.g., five times that of a single emitter), however the area of illumination may have significant asymmetry between the x and y axes. Spatial arrangement 223 has comparable optical power to spatial arrangement 222, but may offer better input symmetry associated with the adjacent stacks of two and three optical spots that are oriented at approximately 90° to those of spatial arrangements 221, 222. Spatial arrangement 224 illustrates the addition of another emitter for a concomitant increase in power, and potentially a further improvement in symmetry about a fiber axis.

As evident from FIG. 2, the architecture of a specific laser diode source may impact the symmetry of a resulting source beam with the spatial arrangement varying as the count of emitters varies for different source powers. As the emitter count declines, it becomes more difficult to array emitters of small NA so as to symmetrically launch a source beam into an optical fiber.

Laser diode source 100 (FIG. 1) may be coupled into a variety of optical fibers. Suitable optical fibers may be single clad or multi-clad (e.g., with two or three cladding layers). FIGS. 3A and 3B depict orthogonal cross-sectional views of an exemplary single-clad optical fiber 301, in accordance with some embodiments. FIG. 3A is a cross-sectional view of fiber 301 with the longitudinal fiber axis 310 in the plane of the page. FIG. 3B is a cross-sectional view of fiber 301 with fiber axis 310 perpendicular to the plane of the page. Fiber 301 includes a core 305 having an outer circumference 308 surrounded by a cladding 315. In some exemplary embodiments, optical fiber 301 is a multi-mode (MM) fiber suitable for supporting multiple beam propagation modes (fundamental and high order modes) within core 305. Cladding 315 has a diameter $D_{Clad}$ while core 305 has a diameter $D_{Core}$. In some exemplary embodiments, core diameter $D_{Core}$ is in the range of 100-400 micron (μm), and the cladding diameter $D_{Clad}$ is in the range of 125-500 μm. Other diameters outside of these exemplary ranges are also possible.

Core 305 may have any suitable composition (e.g., glass, fused silica). Cladding 315 may be a polymer or glass, for example. Each may be doped with impurities to achieve a desired refractive index profile, or "RIP." As used herein, a refractive index profile refers to the refractive index of a fiber as a function of position along a diameter line (e.g., x-axis or y-axis in FIG. 3B) through the fiber and within a plane (e.g. x-y plane in FIG. 3B) perpendicular to fiber axis 310. A one-dimensional RIP along a diameter of the fiber in accordance with some embodiments is shown in FIG. 3A. A two-dimensional RIP may be mapped by accumulating multiple one-dimensional RIPs along diameters of the fiber at different angular positions about fiber axis 310. If the RIP is entirely symmetric about fiber axis 310, the illustrated 1D RIP is independent of azimuthal angle θ (i.e., angularly symmetric, or radially symmetric about the fiber axis).

In the illustrated example, cladding 315 has a substantially flat refractive index n/(i.e., independent of radial distance), but it may alternatively have an index that varies, or is dependent upon, the fiber radius, r. Core 305 has a radially dependent refractive index n(r) that varies from first, maximum, index value at fiber axis 310 down to a second, minimum, index value at outer core radius $r_{Core}$. The minimum index value at $r_{Core}$ is larger than cladding index n1. Although not present in the illustrated RIP, there may be a step down in index between the cladding index n1 and the minimum index value at $r_{Core}$. Other transitions between core 305 and cladding 315 are also possible. For example, there may be a notch between the cladding index n1 and the minimum index value at $r_{Core}$.

In accordance with embodiments herein, core 305 has a radially dependent refractive index n(r) that is non-linear (i.e., has curvature) and follows other than a pure quadratic function of radius r. In some embodiments, core 305 has a radially dependent refractive index n(r) that follows the form of Eq. 1:

$$n(r) = n_0 - Ar^\alpha \quad \text{(Eq. 1)}$$

where $n_0$ is a design refractive index at fiber axis 310, A is a positive scaling constant, and α characterizes the refractive index gradient curvature. For a pure quadratic gradient-index (GRIN) lens, α=2. For some exemplary precessing graded RIP embodiments herein $\alpha \neq 2$ such that n(r) is non-quadratic. The value of $\alpha$ may be selected to differ from 2 by at least some minimum amount sufficient to reduce the angular (and modal) transfer fidelity from that of the quadratic condition, which the inventors have found to improve axial symmetry of the beam, as further described below. The value of a may be further constrained to differ from 2 by no more than some maximum amount where beam propagation confinement becomes significantly worse than the quadratic condition. This boundary is to ensure sufficient brightness of the beam is maintained over a given fiber length. Between these design guidelines, the value of a may vary widely to be either smaller or larger than the parabolic square power, for example from somewhat larger than 1 (a linear gradient) to somewhat smaller than 3. However, noting that large deviations from 2 will induce optical losses reducing brightness, the magnitude of the deviation from 2 may be advantageously less than 0.5 (25%), and more advantageously no more than 0.25 (12.5%). Indeed, the magnitude of the deviation from pure quadratic need not be very large to significantly improve angular symmetry of a beam conveyed over a length of fiber as the inventors have found that a deviation as small as 0.05% (e.g., $\alpha$=2.01) can markedly increase rotational homogenization of an asymmetric input beam relative to a pure quadratic RIP, at least for off-axis components of the beam.

Rotational homogenization resulting from a non-quadratic n(r) function may be attributed to an angular precession of the beam as it propagates along a length of fiber. This precession serves to rotationally mix the input NA without significantly sacrificing beam brightness. The rotational mixing increases angular symmetry, expanding the angles at which the beam propagates in the fiber beyond those of a small input NA. Additionally, for the pure quadratic condition the radially varying refractive index tends to equalize all optical path lengths (refractive index multiplied by physical path distance). This index compensation of longer distances traveled by radially displaced modes tends to reduce modal dispersion within a fiber. A non-quadraticly varying refractive index condition in accordance with embodiments herein will display less such compensation and will therefore also have the advantage of longitudinally homogenizing an input beam.

FIG. 4 illustrates an input beam including components launched at different radial positions, r1, r2 and r3 of fiber 301, in accordance with some embodiments. Radial positions r1-r3 may correspond to three emitters of any of the input NA spatial arrangements illustrated in FIG. 2, for example. In some examples, r1 is approximately 5um from the fiber axis, r2 is approximately 30 µm from the fiber axis, and r3 is approximately 110 µm from fiber axis. FIG. 4 illustrates one propagation cycle (oscillation) for the three launch points. An image of the input NA spatial arrangement is relayed by fiber 301 one GRIN relay length L. For an exemplary wavelength of 880 nm, GRIN relay length Z is approximately 7.8 mm for a pure quadratic GRIN lens. The off-axis rays are relayed and inverted with each spatial period down the length of fiber with the input conditions propagated with a spatial fidelity that depends upon the n(r) curvature, with a pure quadratic n(r) function providing maximum spatial fidelity.

Figure 5:
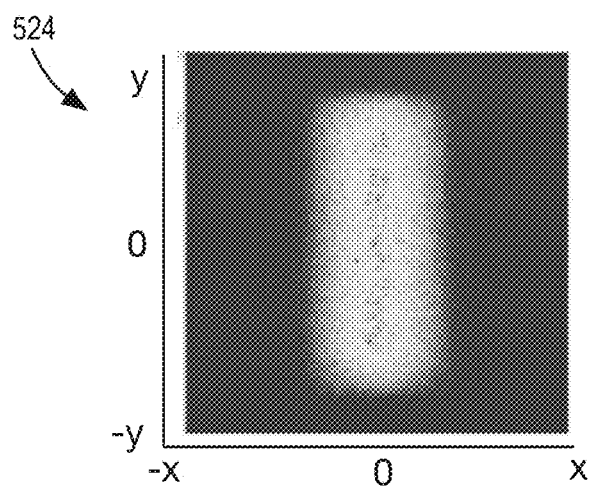
FIG. 5 illustrates a modeled two-dimensional intensity distribution at an input of an optical fiber, in accordance with some embodiments.

FIG. 5 illustrates a two-dimensional intensity distribution 524 modeled for a laser diode source having the spatial arrangement 223 (FIG. 2) coupled into optical fiber 301 (FIG. 3). As shown in FIG. 5, radiance at the fiber input is not symmetric about the fiber axis (0,0) and instead has a substantially rectangular intensity distribution attributable to spatial arrangement 223. A degree of spatial (or angular) asymmetry may be characterized by one or more parameters, such as, but not limited to, a flattening value $$f = \frac{a-b}{a}$$

(where a and b are major and minor orthogonal radii determined at a threshold radiance level). An asymmetric intensity distribution can be further characterized with an angular orientation of the major radius of the intensity distribution about the fiber axis. In the example shown in FIG. 5, intensity distribution 524 has a vertical orientation which may be assigned an insertion angle of 0°, for example.

Figure 6:
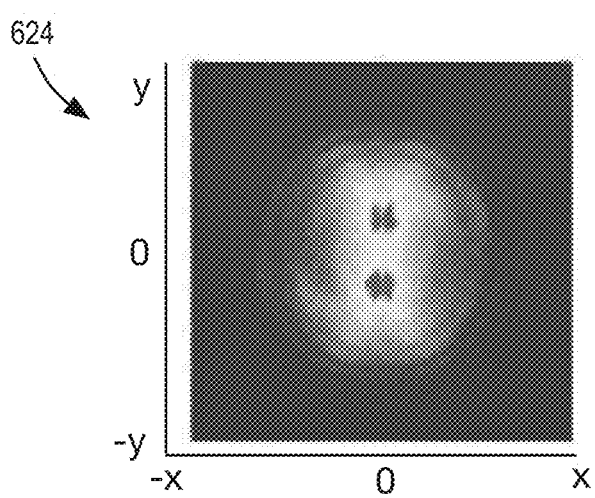
FIG. 6 illustrates a modeled two-dimensional intensity distribution at an output of an optical fiber, in accordance with an optical fiber having a quadratic RIP.

FIG. 6 illustrates a two-dimensional intensity distribution 624 modeled for an output of a 2-meter length of fiber having a reference pure quadratic ($\alpha$=2) GRIN core. As shown, the spatially asymmetric signature of the input intensity distribution 524 remains in the output intensity distribution 624 even after the beam has propagated through the length of fiber (many GRIN relay lengths). The similarity between the intensity distributions 524 and 624 demonstrates the high spatial fidelity achieved by a pure quadratic radial refractive index gradient. As noted above, such spatial fidelity may be desirable in some applications (e.g., imaging, or communication), but may be undesirable in laser applications where output consistency and symmetry are valued.

Angular homogenization as a function of the value of a is evident if viewed along the fiber axis with an angular cycling pattern visible as many oscillations of the relayed input pattern propagate down the fiber length. Notably, angular homogenization is also a function of radial distance with deviations in $\alpha$ inducing more precession at larger radial distances. Hence, light components launched in line very close to the axis will not precess significantly regardless a. The angular homogenization may therefore occur to different degrees as a function of radial position. The differing precession rates may be referred to as "precession dispersion," and will act to ensure axial homogenization of even highly spatio-angularly asymmetric input sources.

Figure 7A:
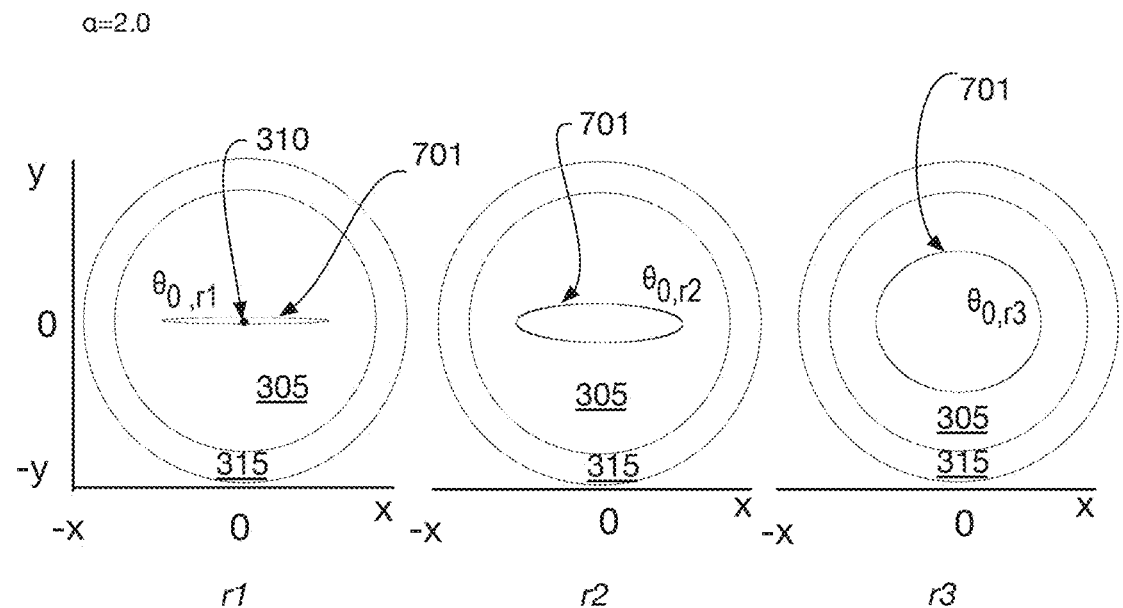
FIGS. 7A, 7B, and 7C illustrate propagation precession of a beam including components launched at different radial positions modeled for RIP having different curvature, in accordance with some embodiments.

FIG. 7A illustrates propagation precession of a beam including components launched at different radial positions modeled for a 250 mm length of a reference pure quadratic RIP. Noting that 250 mm is a relative short length of fiber for typical laser optical systems, these examples are illustrative, and longer lengths of fiber achieving lower rates of precession may be readily implemented. The minimal propagation precession 701 for the reference pure quadratic condition in FIG. 7A may be compared to the large cycling patterns shown in FIGS. 7B and 7C, which similarly model propagation precession for 250 mm lengths of fiber having precessing RIPs, in accordance with two exemplary non-quadratic embodiments.

As shown in FIG. 7A, confinement of the beam is within core 305, well inside of the boundary between core 305 and cladding 315. Such confinement is characteristic of GRIN core fiber. FIG. 7A further illustrates the angular oscillation orientation of three rays having identical insertion angle and 0.188 NA, but different radial launch positions of $r_1$=5 µm, $r_2$=30 µm, and $r_3$=110 µm from fiber axis 310 of the reference pure quadratic core medium ($\alpha$=2). The pure quadratic core media maintains the launch conditions with high spatial (angular) fidelity within the illustrated radial plane because angular rotation (precession) is small. As shown, precession angles $\theta_{o,r1}$, $\theta_{o,r2}$, and $\theta_{o,r3}$ for this reference condition are all much less than 10° (e.g., 1-2°). Hence, regardless of the radial distance, angular precession is insignificant.

Figure 7B:
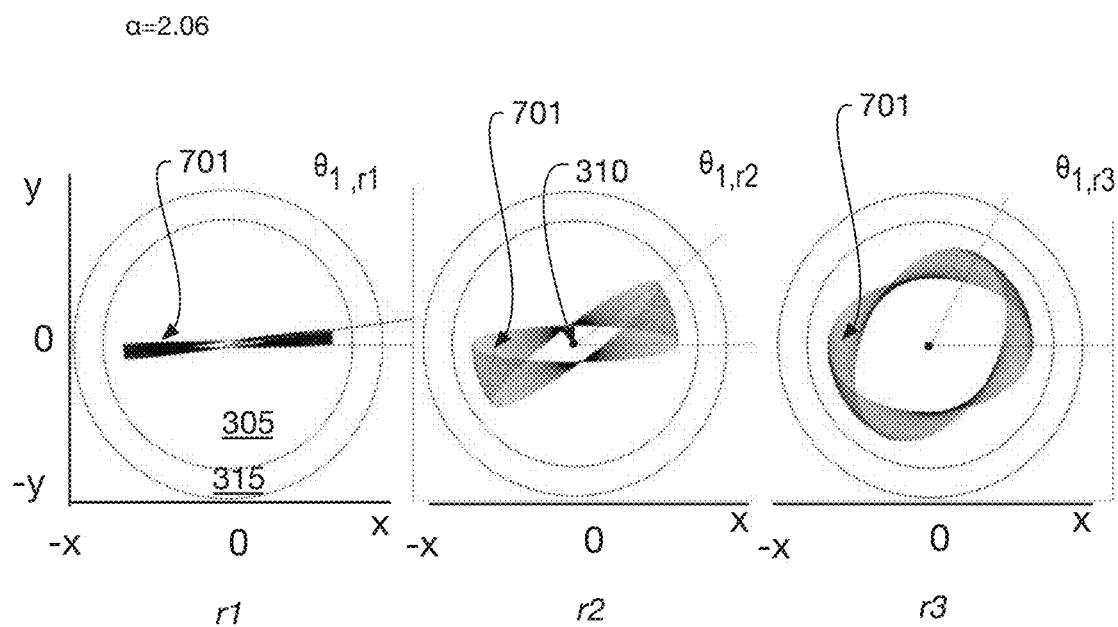

A first non-quadratic GRIN core medium ($\alpha=2.06$) is illustrated in FIG. 7B. This example represents a 3% $\alpha$ value deviation from the pure quadratic condition, and the beam is again confined within core 305, separated from the RI boundary at cladding 315. Radially dependent propagation precession rates are evident with a smallest precession of $\theta_{1,r1}=8°$ for the ray launch position $r_1=5$ µm. A precession $\theta_{1,r2}=36°$ for ray launch position $r_2=30$ µm, and maximum precession $\theta_{1,r3}=62°$ for the ray launch position $r_3=110$ µm. Depending on the asymmetry and radial dimensions of a given input, and the length of a fiber, $\alpha=2.06$ may be more than enough to arrive at an output that is sufficiently more symmetric. Maximum precession rates of 0.25°/mm, or more, may be advantageous where fiber length is a concern. However, for application where greater fiber lengths are tolerable lower maximum precession rates may be suitable with some total maximum precession still being achievable over some greater fiber length. In some embodiments, total maximum precession is at least 90°. Embodiments where total maximum precession is at least 180° may also be advantageous. Either of these thresholds of maximal precession may be achieved for the illustrated $\alpha=2.06$ example by extending the fiber length another 100-200 mm.

Figure 7C:
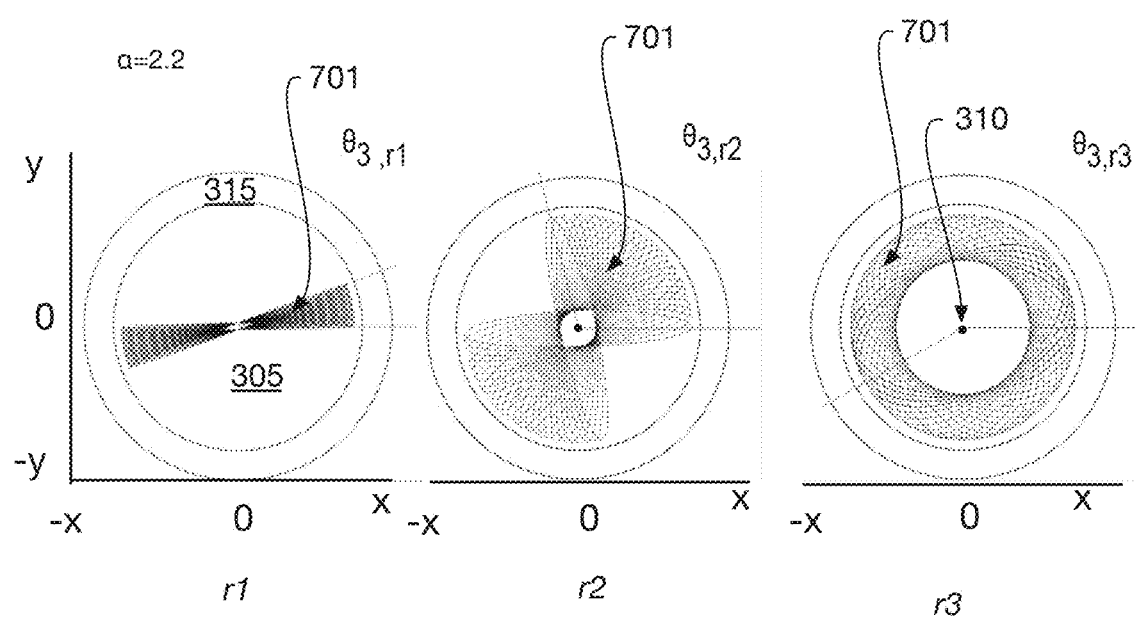

FIG. 7C illustrates a second non-quadratic GRIN core medium where $\alpha$ value deviation from the reference quadratic condition is increased to 10% ($\alpha=2.2$). The beam remains confined within core 305, but is noticeably closer to the RI boundary at cladding 315. This trend illustrates how an upper bound on the a value deviation may be manifested in brightness loss. Propagation oscillations precess from a smallest precession of $\theta_{2,r1}=21°$ for the ray launch position $r_1=5$ µm. A precession $\theta_{2,r2}=104°$ for ray launch position $r_2=30$ µm, and maximum precession $\theta_{1,r3}=209°$ for the ray launch position $r_3=110$ µm. Maximum propagation precession in this example is over 180°, fully homogenizing the beam about fiber axis 310 within the 250 mm fiber length. Fibers that angularly homogenize to this extent can be assured to remove any angular and/or spatial asymmetry of an input for any practical fiber length. The degree of maximum precession desired (i.e., choice of $\alpha$) may therefore be chosen based on the expected input dimensions and fiber length, and the desired maximum total precession (be it 90°, 180° etc.).

Figure 8:
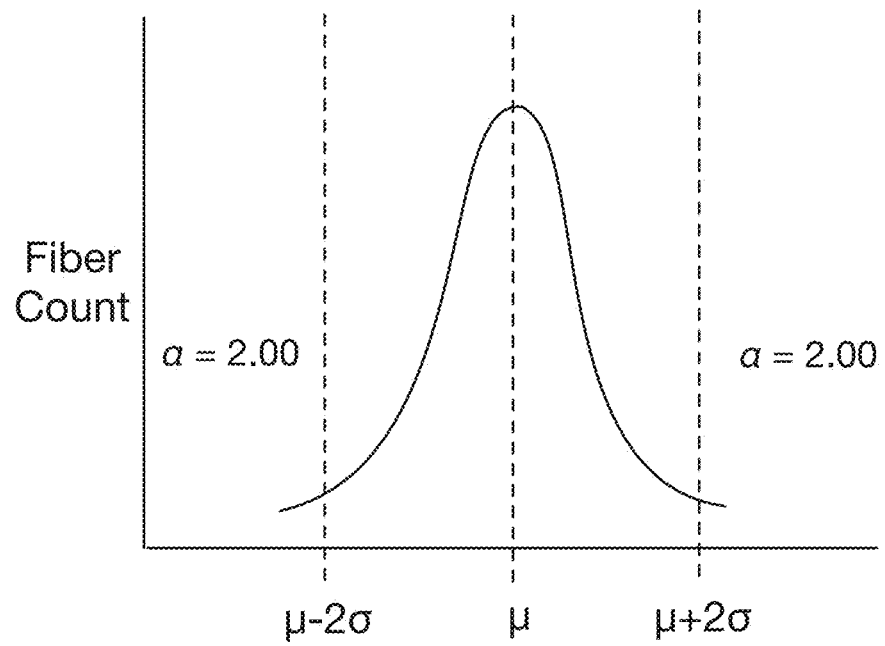
FIG. 8 illustrates a distribution of optical fibers having a non-quadratic RIP, in accordance with some embodiments.

In accordance with some embodiments, the value of a selected to avoid the quadratic condition even when fiber manufacturing tolerances are included. FIG. 8 illustrates an exemplary distribution of optical fibers manufactured with a core having a non-quadratic RIP. For some population of fibers the distribution of a values has some mean value $\mu$ that is sufficiently far from the quadratic condition that fibers doped according to $\alpha$ values at least 2 standard deviations from the mean value u are still above (e.g., $\mu-2\sigma>2.00$), or below (e.g., $\mu+2\sigma<2.00$) the quadratic condition by some predetermined threshold amount. Hence, the value of $\alpha$ may be first determined to achieve a given degree of angular homogenization over a predetermined length of fiber, and that value of $\alpha$ may be adjusted to further deviate from the quadratic condition by enough to ensure even the $2\sigma$ manufacturing condition (or a $3\sigma$ condition, etc.) has the desired $\alpha$. The value of $\alpha$ may therefore be more precisely tuned off of the quadratic condition for more tightly controlled manufacturing processes.

Figure 9:
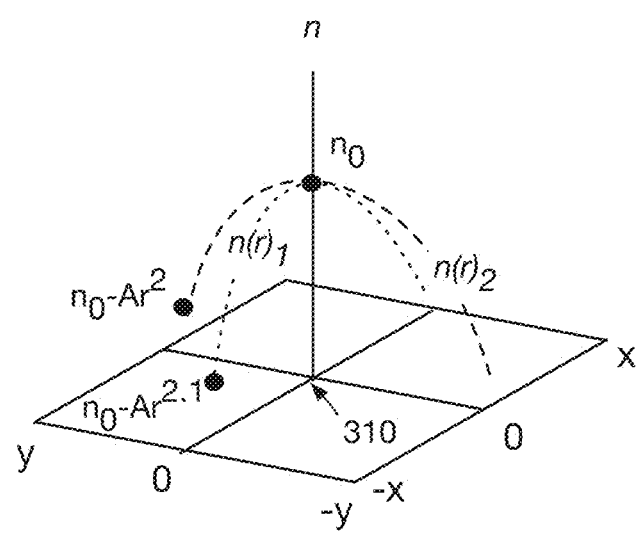
FIG. 9 illustrates a graph of an asymmetric RIP, in accordance with some embodiments.

Although the above discussion has assumed the non-quadratic RIP is symmetric about the fiber axis, embodiments herein are not limited to symmetric non-quadratic RIPs. In some embodiments, a fiber has a non-symmetric RIP that is non-quadratic in less than all azimuth angles. Such a "partially quadratic" fiber may have a quadratic profile realized in only a preferred (non-preferred) orientation. The RIP in other orientations is sufficiently non-quadratic to induce relay precession substantially as described above. FIG. 9 illustrates a graph of an asymmetric RIP, in accordance with some embodiments. In the example shown, n(r) is a function of the angular orientation about the fiber axis 310, with n(r) at a first orientation (e.g., 0°) following the quadratic curve from $n_0$ to $n_0-Ar^2$ and n(r) at a second orientation (e.g., 90°) following non-quadratic curve from $n_0$ to $n_0-Ar^{2.1}$, for example. A fiber having such an angular variation in RIP will tend to relay an input image aligned to the first orientation with higher spatial fidelity, and relay an input image aligned to the second orientation with lower spatial fidelity because of the greater precession induced into a beam launched in the second orientation. For such a fiber, the propagated beam may therefore display a launch angle dependence.

Figure 10A:
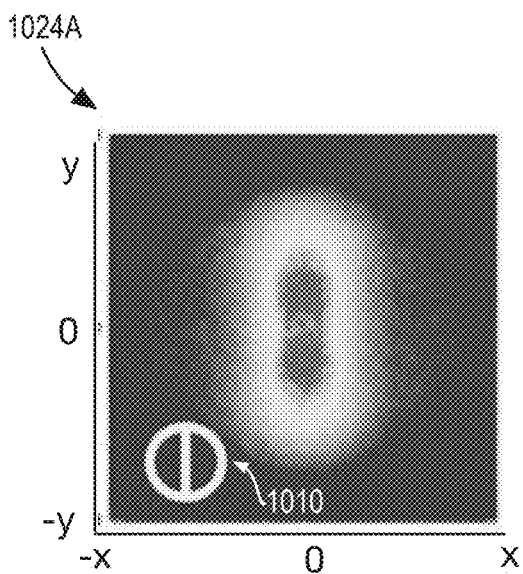
FIGS. 10A, 10B, 10C and 10D illustrate modeled two-dimensional intensity distribution at an output of an optical fiber, in accordance with some embodiments.
Figure 10B:
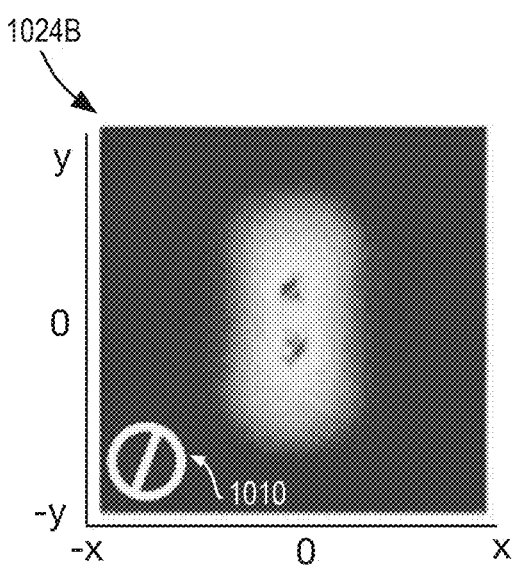
Figure 10C:
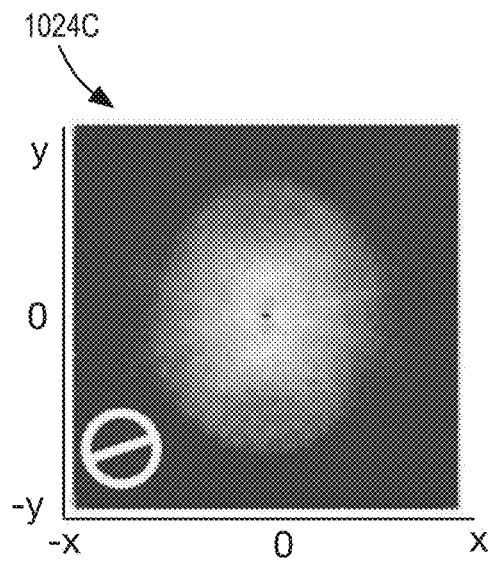
Figure 10D:
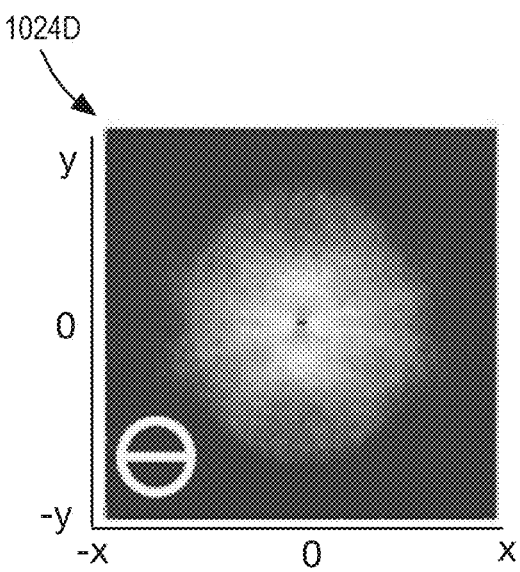

FIGS. 10A, 10B, 10C and 10D illustrate two-dimensional intensity distributions at an output of an optical fiber 2m long modeled for the input beam shown in FIG. 5, in accordance with some embodiments. In FIG. 10A-10D, orientation icon 1010 represents the orientation of the fiber relative to the input beam intensity distribution 524 (FIG. 5). As shown in FIG. 10A, when the input asymmetry has a first orientation (e.g., 0°), the output beam intensity distribution 1024A closely matches the spatial signature and angular asymmetry of the input intensity distribution 524. As the fiber orientation begins to deviate from that of the input beam, for example to ~20° in FIG. 10B, the output beam intensity distribution 1024B begins to lose some of the spatial signature of input beam intensity distribution 524 with symmetry increasing. Symmetry is significantly improved in output beam intensity distribution 1024C (FIG. 10C) where the fiber orientation is rotated ~80°. At 90°, the input beam is launched at the second orientation along the n(r) having the non-quadratic gradient curvature. Although the output intensity distributions modeled in FIG. 10A-10D serve as an illustration, it should be noted that the inventors have also experimentally observed the same phenomena.

Figure 11:
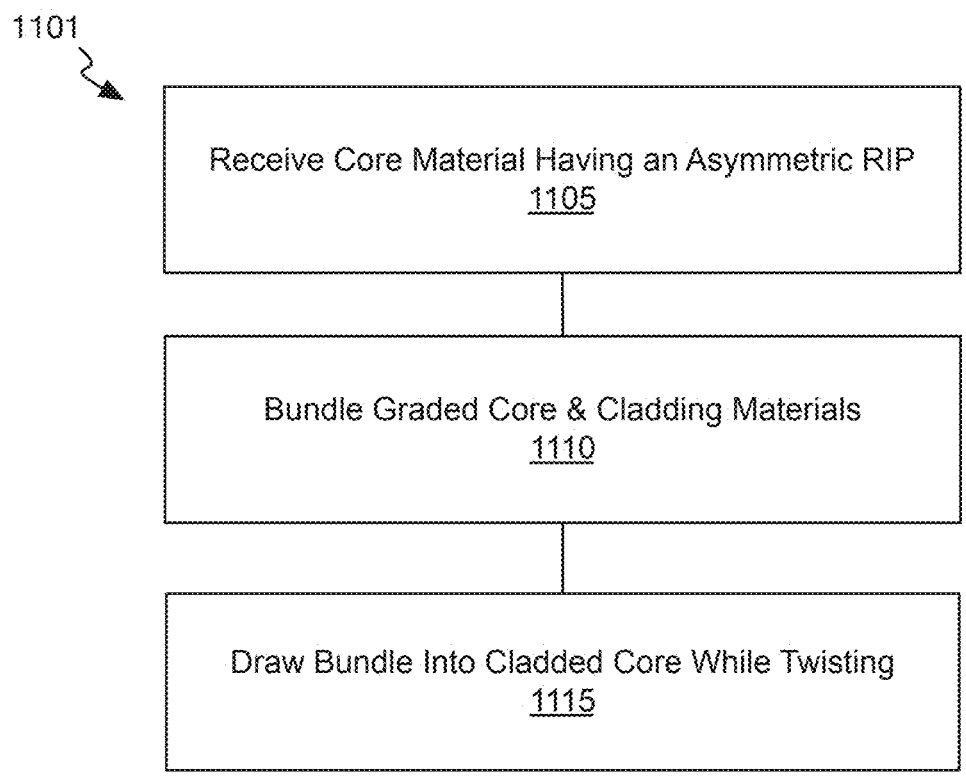
FIG. 11 illustrates a method of fabricating an angularly homogenizing optical fiber, in accordance with some embodiments.

A fiber with an asymmetric non-quadratic RIP would therefore need to be properly oriented relative to an asymmetric input beam to ensure angular homogenization resulted in a sufficiently symmetric output beam pattern. However, angular homogenization of such a fiber may be improved, and fiber orientation dependency reduced, by periodically introducing the non-quadratic RIP into an otherwise non-precessing RIP path. FIG. 11, for example, illustrates method 1101 for fabricating an angularly homogenizing optical fiber in accordance with some embodiments where a fiber is twisted during a draw process. As shown in FIG. 11, methods 1101 begin at block 1105 where a core material (e.g., wire or rod) is received. In some embodiments, the core material has been doped to have an angularly asymmetric RIP, for example of the type illustrated in FIG. 9 where at least some orientation has a sufficiently non-quadratic RIP. In some alternative embodiments, the core wire received has an insufficiently non-quadratic RIP. For example, all orientations of the core material may too closely match a true quadratic r(n) function to result in significant propagation precession over a predetermined length of the fiber. Methods 1100 continue at block 1110 where the GRIN core starting material is bundled with cladding starting material, for example according to any technique and parameters known in the art. At block 1115, the bundle is drawn down into a cladded fiber while twisting (angularly rotating) the workpiece.

Figure 12:
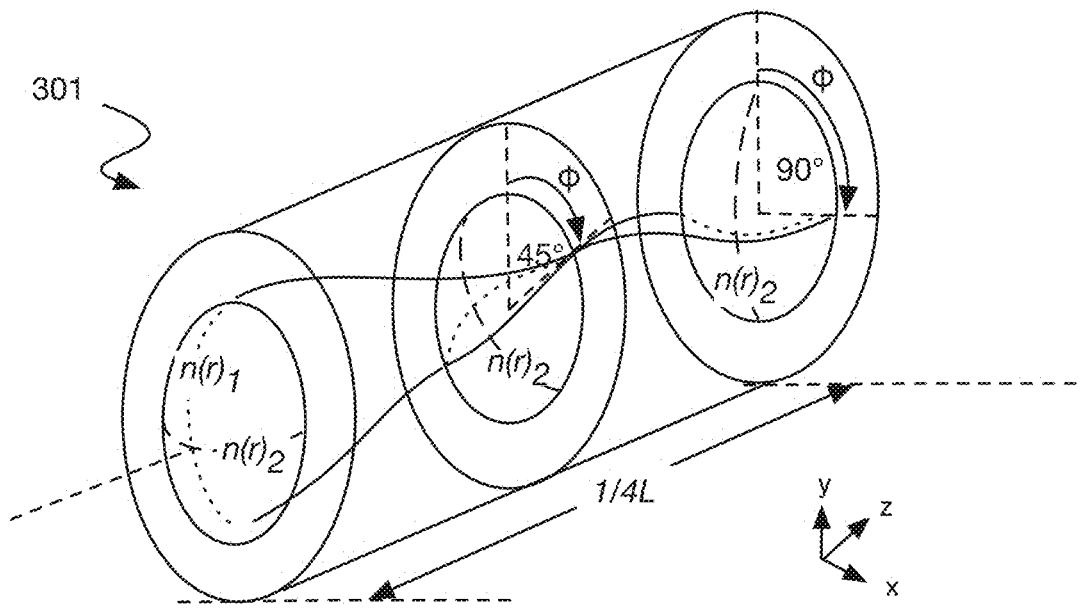
FIG. 12 illustrates twist in a drawn fiber having an axially asymmetric RIP, in accordance with some embodiments.

The twist rate may be at a spatial cycle on the order of the GRIN relay length L. FIG. 12 illustrates twist during a draw of a fiber having an axially asymmetric RIP, in accordance with some embodiments of methods 1101. In FIG. 12, a non-quadratic RIP is at 90° of a quadratic RIP, the spatial cycle comprises at least a 90° rotation over ¼ the GRIN relay length L. However, the twist may be at an even lower rate since precession effects are not reversible and accumulate throughout propagation. For embodiments where the starting core wire has true quadratic RIP in all orientations, twisting during the draw according to methods 1101 may nevertheless provide enough perturbation to the initially quadratic RIP to induce significant propagation precession in the resulting fiber.

Figure 13:
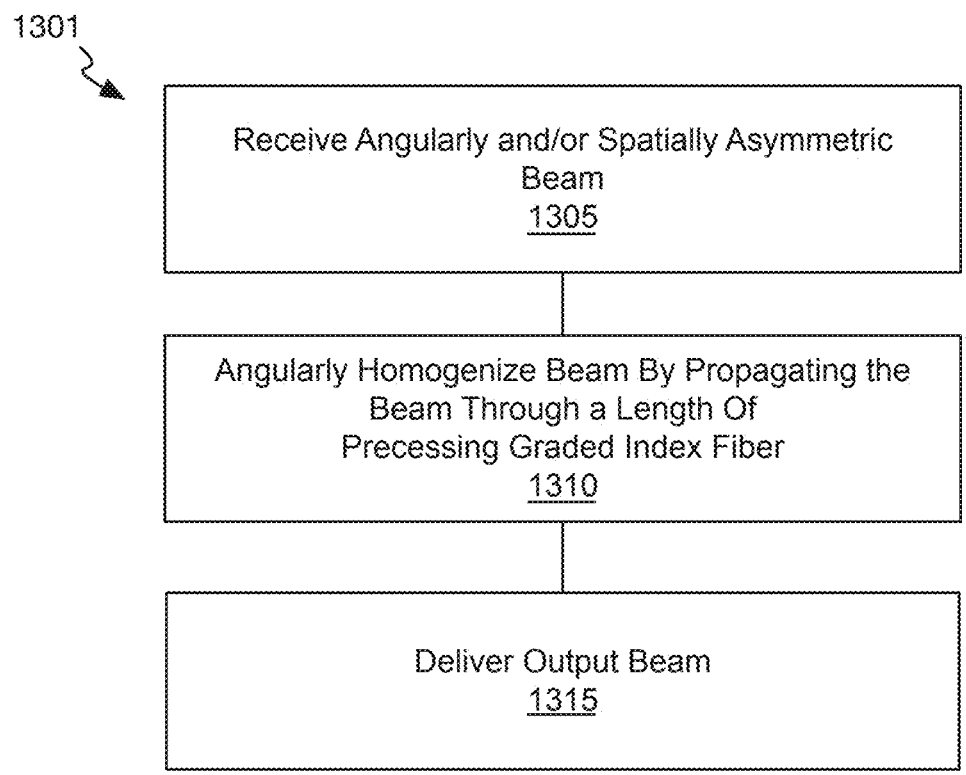
FIG. 13 illustrates a method of angularly homogenizing an asymmetric input beam, in accordance with some embodiments.

FIG. 13 illustrates exemplary methods 1301 for homogenizing an angularly asymmetric input beam, in accordance with some embodiments. Methods 1301 may be performed with any optical system that includes a rotationally homogenizing fiber in accordance with one or more the embodiments described elsewhere herein. Methods 1301 begin at block 1305 where an angularly and/or spatially symmetric input beam is received. In some embodiments such a beam is received from a diode laser source module, for example having 1-5 emitters arrayed into any arrangement, optical power, and wavelength characteristics suitable for a particular optical system.

At block 1310, the input beam is angularly homogenized by propagating the beam through a length of a precessing gradient index fiber. In some embodiments the angular homogenization induces a maximum propagation precession of at least 90° about the axis of the fiber. The precessing gradient index fiber may have one or more of the properties or characteristics described elsewhere herein. For example, in some embodiments the precessing gradient index fiber has a graded RIP that follows a non-quadratic function of the core radius. In some embodiments, the non-quadratic RIP deviates from a quadratic condition by at least 0.05%, and may deviate by 10%, or more. In some embodiments, the non-quadratic RIP is symmetric about the fiber axis. In some other embodiments, the non-quadratic RIP is asymmetric about the fiber axis and the orientation of asymmetry varies over a length of the fiber. In some such embodiments the orientation of the asymmetry varies periodically over a length of the fiber.

Methods 1301 end at block 1315 where an output beam is delivered, for example out of the precessing gradient index fiber. In exemplary embodiments, the output beam delivered is more angularly and/or spatially symmetric than the input beam. For example, a measure of ellipticity, or flattening in the fiber input intensity distribution may be reduced by 15%, or more (e.g., 25-50%) in the fiber output intensity distribution.

Figure 14:
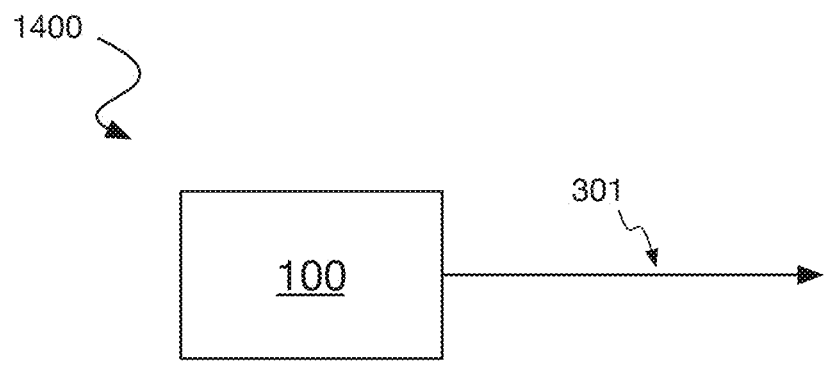
FIG. 14 is a schematic of an optical system including a diode laser input source coupled into an angularly homogenizing fiber, in accordance with some embodiments.

An angularly homogenizing fiber having one or more of the attributes described elsewhere herein may be incorporated into any optical system for which the composition and dimensions are suitable, as embodiments herein are not limited in this context. FIG. 14, for example, is a schematic of an optical system 1400 including laser diode source 100 optically coupled into an angularly homogenizing fiber 301, in accordance with some embodiments. In other optical systems an alternate laser source may be coupled into angularly homogenizing fiber 301. In some such embodiments, the alternate laser source outputs an angularly and/or spatially asymmetric beam into angularly homogenizing fiber 301. Optical systems including angularly homogenizing fiber 301 may further include one or more additional optical elements coupled to any output of fiber 301, as embodiments herein are not limited in this respect.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the invention is not limited to the embodiments so described, but can be practiced with modification and alteration without departing from the scope of the appended claims. For example the above embodiments may include specific combinations of features as further provided below.

However, the above embodiments are not limited in this regard and, in various implementations, the above embodiments may include the undertaking of only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

We claim:

1. An optical fiber, comprising:
    an input end;
    an output end;
    a core having a non-linear refractive index profile (RIP) that decreases from a first refractive index no at an axis of the fiber to a second refractive index at an outer circumference of the core according to a non-quadratic function $n(r)=n_0-Ar^\alpha$ wherein n(r) is a refractive index at a radius r,
    wherein the radius r is measured from the axis of the optical fiber,
    wherein A is a positive scaling constant, and
    wherein α is an exponent larger than 1, smaller than 3, and not equal to 2; and
    a cladding surrounding the outer circumference of the core, the cladding having at least a third refractive index, smaller than the second index,
    wherein, between the input end and the output end, the non-linear RIP rotationally and longitudinally homogenizes input light, input at the input end, to create output light, output at the output end, and
    further wherein:
        the core comprises a dopant,
        the core is manufactured from a plurality of fibers,
        the plurality of fibers comprise the dopant associated with a distribution of the exponent α characterized by a mean value μ and a standard deviation σ, and
        the mean value μ of the exponent a deviates from two by more than two standard deviations σ.

2. The optical fiber of claim 1, wherein the RIP induces at least 45° of maximum propagation precession with the fiber.

3. The optical fiber of claim 1, wherein the exponent a deviates from 2 by at least 3%.

4. The optical fiber of claim 3, wherein the value of the exponent a deviates from 2 by less than 25%.

5. The optical fiber of claim 1, wherein the RIP is symmetric about the axis of the fiber.

6. The optical fiber of claim 1, wherein the core has a diameter between 100-400 μm, and the cladding has diameter of 125-500 μm.

7. An optical system, comprising:
a laser diode source; and
an optical fiber coupled to an output of the laser diode source, wherein the optical fiber comprises an input end and an output end and wherein the optical fiber comprises a core having a non-linear refractive index profile (RIP) that decreases from a first refractive index $n_0$ at an axis of the fiber to a second refractive index at an outer circumference of the core according to a non-quadratic function $$n(r)=n_0-Ar^\alpha$$

wherein n(r) is a refractive index at a radius r,
wherein the radius r is measured from the axis of the optical fiber,
wherein A is a positive scaling constant,
wherein $\alpha$ is an exponent larger than 1, smaller than 3, and not equal to 2, and wherein, between the input end and the output end, the non-linear RIP rotationally and longitudinally homogenizes input light, input at the input end, to create output light, output at the output end, and further wherein:
the core comprises a dopant,
the core is manufactured from a plurality of fibers,
the plurality of fibers comprise the dopant associated with a distribution of the exponent $\alpha$ characterized by a mean value u and a standard deviation $\sigma$, and
the mean value $\mu$ of the exponent $\alpha$ deviates from two by more than two standard deviations $\sigma$.

8. The optical system of claim 7, wherein the laser diode source includes a plurality of diode emitters that combine to provide a source beam, as the input light, with a smaller numerical aperture than that of the core.

9. The optical system of claim 8, wherein the source beam is to have a first amount of asymmetry about the axis of the optical fiber at the input end of the fiber, and wherein the optical fiber is to provide a beam with a second amount of asymmetry about the axis of the optical fiber at the output end of the fiber, the second amount less than the first amount.

10. The optical system of claim 9, wherein the optical fiber rotationally homogenizes the source beam by inducing propagation precession.

11. The optical system of claim 8, wherein the plurality of diode emitters comprises fewer than five emitters, each of the emitters generating an elliptical beam pattern.

* * * * *